June 7, 1927.
M. M. GILLETTE
FRAME
Filed May 8, 1926
1,631,807
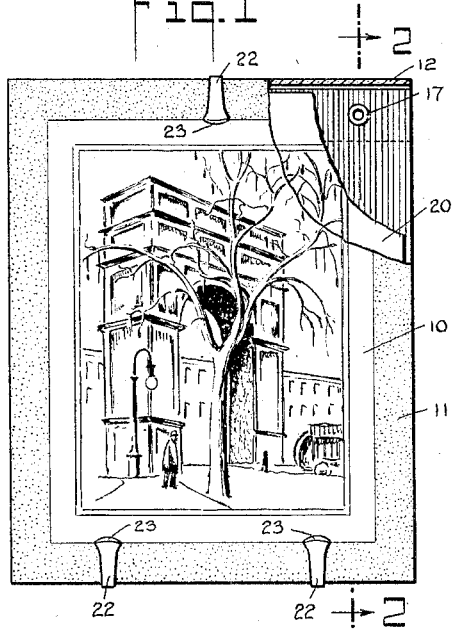
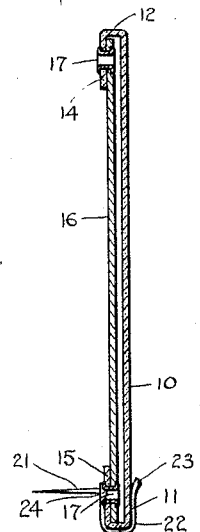
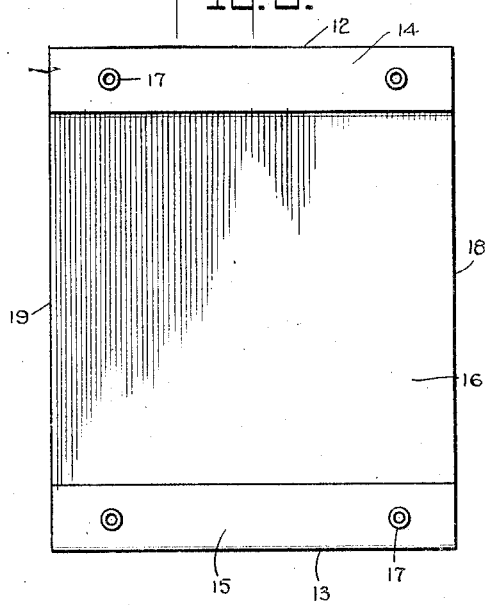
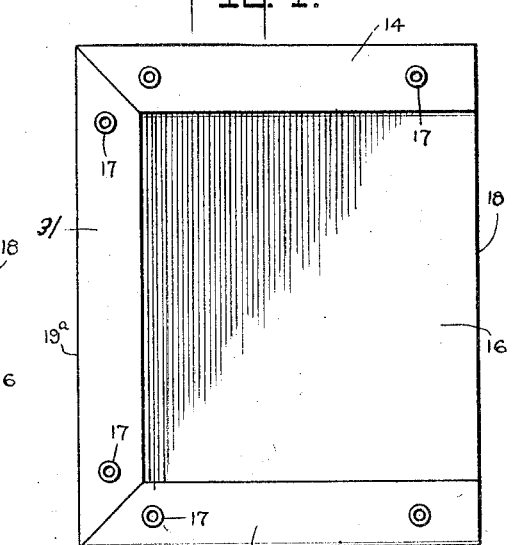

Patented June 7, 1927.

1,631,807

UNITED STATES PATENT OFFICE.

MAUDE M. GILLETTE, OF NEW YORK, N. Y.

FRAME.

Application filed May 8, 1926. Serial No. 108,207.

This invention relates to enclosed frames for pictures and the like.

An object of this invention is to provide a construction of frame of light weight, readibility of suspension from a wall or other suitable support, and of non-fragile transparent material for the front portion of the frame.

A further object of the invention is to provide a frame including its non-fragile transparent material disposed wholly over the front face of the picture enclosed therein, thereby protecting the picture from being soiled or otherwise damaged.

Pursuant to my invention, the body portion of the frame is formed of transparent celluloid, gelatine or the like, which provides for the transparency of the picture or the like enclosed in the frame. Such transparent sheet extends over the whole of the front of the frame, the outer margin of the front face of such sheet being embossed or depressed, or stippled, or painted, or printed or the like in simulation of a frame of wood or other non-transparent material.

Further features and objects of the invention will be more fully understood from the following detail description and the accompanying drawings, in which Fig. 1 is a front view of a form of frame embodying my invention, the upper right hand corner being broken away, to show otherwise hidden parts;

Fig. 2 is a sectional elevation on line 2—2 of Fig. 1;

Fig. 3 is a rear face elevation of Fig. 1, showing one modification; and

Fig. 4 is a similar rear face elevation, showing another modification.

Referring to Figs. 1 and 2, the front of the frame is formed of a sheet 10 of clear celluloid or like transparent, non-fragile material. Such sheet 10 extends over the whole of the front face of the resulting enclosed frame, as will be apparent from Figs. 1 and 2.

In the form of the illustration shown in Figs. 1 and 2, the frame is of rectangular outline and accordingly the outer margin 11 of the sheet 10 is of similar rectangular outline. Such outer margin 11 is embossed or depressed, or stippled or painted or printed or the like for the desired width to indicate a frame per se of wood or other non-transparent material.

Such sheet 10 extends beyond the margin 11 on at least two sides, as at the upper side 12 and lower side 13, see Fig. 2, and further projects on the rear face of the resulting frame substantially parallel to the front portion of the material as is indicated respectively at 14, 15, and to such extents as may be desired. Such resulting flanges 14, 15, are secured to a sheet 16, of cardboard, or chip board or other suitable paper stock or other stiffening material as by means of eyelets 17 or the like.

A simple form of my invention appears in Fig. 3, wherein the lateral sides 18, 19 are open, to permit a picture, such as the indicated etching 20 shown in Fig. 1 to be inserted from either lateral end within the space between the front portion 10 of the transparent material and the stiffening sheet 16, and in suitable relation to the margin 11.

Another form of my invention is shown in Fig. 4, wherein the front portion 10 of the transparent material is extended at a third lateral side 30 to provide a flange 31 similar to the aforesaid flanges 14, 15, and similarly secured to the sheet of stiffening material 16 or the like by eyelets 17 or other suitable mechanical means, thus providing for a single side 18 for insertion of the picture. In a similar manner, the open side of the frame may be disposed at the lower or upward side of the frame.

A simple means for supporting or suspending my frame is a hook nail comprising a nail portion 21 for insertion in plaster, wood or the like, as in a wall of a room, and a resilient hook end 22 of preferably flattened steel or other suitable material. The forward portion 23 of the hook end 22 is preferably diverging in width and outwardly flaring to enhance the area of contact and facilitate the entry of the frame within the hook end 22 of the nail.

If desired, the hook portion of the nail may include a lug 24, serving to receive the blows of a hammer or the like for inserting the nail portion 21 in the wall of a room or the like and also positioned to be received within the opening of an eyelet 17.

If desired, the margin 11 of the frame may simulate a frame of wood or like material by the use of a strip of printed paper or the like applied by adhesive or the like to the outer margin portion of the sheet 10.

Whereas, I have described my invention by reference to specific forms thereof, it will be understood that many changes and modifications may be made without departing from the spirit of the invention.

I claim:

1. A frame for enclosing pictures or the like, comprising a sheet of transparent material having a front portion thereof extending over the front face of the frame, the outer margin of said front portion being marked to simulate a wooden frame, said sheet extending integrally about certain of the sides of said front portion and further projecting rearwardly and inwardly thereof, said sheet terminating at one of the remaining sides of said front portion to provide an opening for the insertion and removal of the picture, a sheet of stiffening material serving as the back of the frame, means for permanently securing said inwardly projecting portions to said sheet of stiffening material, and means engaging said sheet of transparent material for supporting said frame.

2. A frame for enclosing pictures or the like, comprising a sheet of transparent material having a front portion thereof extending over the whole of the front face of the frame, the outer margin of said front portion being marked to simulate a wooden frame, said sheet extending rearwardly integrally about certain of the sides of said front portion and further projecting inwardly thereof, said sheet terminating at one of the remaining sides of said front portion to provide an opening for the insertion and removal of the picture, a sheet of stiffening material serving as the back of the frame, means for permanently securing said inwardly projecting portions to said sheet of stiffening material, and means engaging said sheet of transparent material for supporting said frame.

3. A frame for enclosing pictures or the like, comprising a sheet of transparent material having a front portion thereof extending over the front face of the frame, the outer margin of said front portion being marked to simulate a wooden frame, said sheet extending rearwardly integrally about certain of the sides of said front portion and further projecting inwardly thereof, said sheet terminating at one of the remaining sides of said front portion to provide an opening for the insertion and removal of the picture, a sheet of stiffening material serving as the back of the frame, spaced mechanical means for permanently securing said inwardly projecting portions to said sheet of stiffening material, and means engaging said sheet of transparent material for supporting said frame.

4. An inclosed frame for pictures and the like, comprising a sheet of transparent material having a front portion extending over the front face of the frame, the outer margin of said front portion being marked to simulate a wooden frame, said sheet extending at least two sides of said frame and projecting rearwardly and inwardly thereof, a sheet of stiffening material, eyelets connecting opposite ends of said sheet of stiffening material to oppositely disposed projecting portions of said rearwardly and inwardly projecting portions of said transparent material, said sheet of transparent material terminating at one of the remaining sides of said frame to thereat provide an opening for the insertion and removal of the picture, and a nail for suspending said frame, said nail having a lug extending into an opening of one of said eyelets and further having a hook portion extending about one of said two sides of the frame to a front portion of said sheet of transparent material.

In testimony whereof I have signed this specification this 8th day of May, 1926.

MAUDE M. GILLETTE.